US 8,447,040 B2

(12) United States Patent
Goto

(10) Patent No.: US 8,447,040 B2
(45) Date of Patent: May 21, 2013

(54) COMMUNICATION APPARATUS, CONTROL METHOD THEREOF, AND STORAGE MEDIUM

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 12/681,017

(22) PCT Filed: Dec. 2, 2008

(86) PCT No.: PCT/JP2008/072216
§ 371 (c)(1),
(2), (4) Date: Mar. 31, 2010

(87) PCT Pub. No.: WO2009/072639
PCT Pub. Date: Jun. 11, 2009

(65) Prior Publication Data
US 2010/0208897 A1    Aug. 19, 2010

(30) Foreign Application Priority Data
Dec. 5, 2007    (JP) ................................. 2007-314793

(51) Int. Cl.
*H04L 9/00* (2006.01)
(52) U.S. Cl.
USPC .......................................... 380/279; 713/163
(58) Field of Classification Search
USPC .......................................... 380/279; 713/171
See application file for complete search history.

(56) References Cited

U.S. PATENT DOCUMENTS

| | | | |
|---|---|---|---|
| 2002/0194384 A1 | 12/2002 | Habetha | |
| 2005/0152305 A1* | 7/2005 | Ji et al. | 370/328 |
| 2006/0036856 A1* | 2/2006 | Kok | 713/168 |
| 2006/0200678 A1* | 9/2006 | Yamada et al. | 713/182 |
| 2006/0246947 A1 | 11/2006 | Fujii et al. | |
| 2007/0206537 A1* | 9/2007 | Cam-Winget et al. | 370/331 |
| 2010/0208896 A1 | 8/2010 | Goto | |

FOREIGN PATENT DOCUMENTS

| | | |
|---|---|---|
| CN | 1394419 | 1/2003 |
| CN | 1855865 | 11/2006 |
| JP | 2004-513565 | 4/2004 |
| JP | 2006-246219 | 9/2006 |

(Continued)

OTHER PUBLICATIONS

Manivannan et al., "Alternative Pair-wise Key Exchange Protocols (IEEE 802.11i) in Wireless LANs", 2006, IEEE, pp. 1-8.*

(Continued)

*Primary Examiner* — Matthew Smithers
(74) *Attorney, Agent, or Firm* — Fitzpatrick, Cella, Harper & Scinto

(57) ABSTRACT

A first communication apparatus that functions as a providing apparatus that provides an encryption key or as a receiving apparatus that receives an encryption key provided by a providing apparatus, and that performs a key sharing process for sharing an encryption key with another apparatus, confirms whether or not the first communication apparatus functioned as the providing apparatus in the key sharing process performed among a plurality of apparatuses present on a network in which the first communication apparatus is joining; compares identification information of a second communication apparatus that has newly joined the network with identification information of the first communication apparatus; and determines whether or not the first communication apparatus is to function as a providing apparatus in the key sharing process performed between the first and the second communication apparatuses based on the result of the confirmation and the comparison.

8 Claims, 9 Drawing Sheets

FOREIGN PATENT DOCUMENTS

| | | |
|---|---|---|
| JP | 2006-311139 A | 11/2006 |
| JP | 2006-332895 | 12/2006 |
| JP | 2007-150712 | 6/2007 |
| WO | 2006/093161 A1 | 9/2006 |

OTHER PUBLICATIONS

Nyberg et al., "Wireless Group Security Using MAC Layer Multicast", 2007, IEEE, pp. 1-8.*

Chinese Office Action (w/translation), dated Feb. 27, 2012, issued by the State Intellectual Property Office of the People's Republic of China, in Chinese Patent Application No. 200880118788.9.

T. Charles Clancy, "Security Review of the Light-Weight Access Point Protocol", Department of Computer Science, Information Systems Security Lab, University of Maryland, College Park, pp. 1-5, May 12, 2005. (www.cs.umd.edu/~clancy/docs/lwapp-review.pdf).

Lusheng Ji, et al., "Self-Organizing Security Scheme for Multi-hop Wireless Access Networks," 2004 IEEE Aerospace Conference Proceedings, pp. 1231-1240, 2004.

"Ad Hoc networks and mesh networks", 1st edition, Corona Publishing Co., Japan, pp. 116-122.

* cited by examiner

COMMUNICATION APPARATUS, CONTROL METHOD THEREOF, AND STORAGE MEDIUM

This is a U.S. National Phase of PCT/JP2008/072216, internationally filed on Dec. 2, 2008.

TECHNICAL FIELD

The present invention relates to a communication apparatus, a control method thereof, and a storage medium.

BACKGROUND ART

Communication data is conventionally encrypted in order to prevent the data from being intercepted, tampered with, and so on. Ensuring a secure communication path is particularly important in wireless communication, where data can easily be intercepted.

For example, in the infrastructure mode for wireless LAN, the communication terminal and access point are provided with a standard specification known as WEP (Wired Equivalent Privacy). With WEP, an encryption key is set in the communication terminal and access point in advance, and security is ensured by using that encryption key each time communication is undertaken. However, in such a scheme, the encryption key is constantly fixed, and the strength of the encryption algorithms employed in WEP is low. For these reasons, it has been pointed out that there are many situations where WEP cannot ensure security.

To solve this problem, a standard specification known as WPA (Wi-Fi Protected Access) has been developed. WPA increases security not only by improving the strength of the encryption algorithms, but also by generating a new encryption key for each session in which a communication terminal joins a network.

In infrastructure mode, data is sent to other communication terminals via an access point, and thus the only direct communication that is performed is performed with the access point. It is therefore only necessary to ensure the security of communication with the access point. However, in ad-hoc mode, there is no access point, and thus communication is carried out directly with the partner with which one wishes to communicate. In other words, in order for terminals to carry out encrypted communication with other terminals, it is necessary for each terminal to either hold encryption keys for each of the other terminals or to utilize an encryption key that is common across the entire network.

In the case where each terminal holds an encryption key for each of the other terminals, it becomes more complicated and difficult to manage the encryption keys as the number of terminals increases.

However, utilizing an encryption key that is common across the entire network reduces the load of each terminal with respect to key management.

For example, Japanese Patent Laid-Open No. 2006-332895 discusses a method for using encryption keys in ad-hoc mode.

However, when using a common encryption key, there is a problem that it is difficult to distribute the same encryption key to new terminals that have newly joined the network.

The WPA scheme for wireless LANs uses a "group key" as an encryption key shared by multiple terminals. By implementing a four-way handshake and a group key handshake, the group key is sent from the terminal that initiated the four-way handshake to the partner terminal. However, the terminal that initiates the four-way handshake is not set when in ad-hoc mode.

Furthermore, in ad-hoc mode, there is no scheme for intensively managing the terminals that are present on a network. The terminals already joined to the network thus do not know which terminals do not hold the group key. For this reason, it is difficult for the terminals already joined to the network to discover which terminals do not hold the group key and initiate a four-way handshake.

Finally, when a terminal that has newly joined the network initiates a four-way handshake, the new terminal ends up distributing the group key, and thus the group key that has been used on the network thus far cannot be distributed to the new terminal.

DISCLOSURE OF INVENTION

It is an object of the present invention to enable an encryption key to be shared with communication apparatuses that have newly joined a network even in an environment such as an ad-hoc mode.

According to one aspect of the present invention, a first communication apparatus that functions as a providing apparatus that provides an encryption key or as a receiving apparatus that receives an encryption key provided by a providing apparatus, and that performs a key sharing process for sharing an encryption key with another apparatus, includes: confirmation unit adapted to confirm whether or not the first communication apparatus functioned as the providing apparatus in the key sharing process performed among a plurality of apparatuses present on a network in which the first communication apparatus is joining; comparing unit adapted to compare identification information of a second communication apparatus that has newly joined the network with identification information of the first communication apparatus; and determination unit adapted to determine whether or not the first communication apparatus is to function as a providing apparatus in the key sharing process performed between the first communication apparatus and the second communication apparatus based on the result of the confirmation performed by the confirmation unit and the result of the comparison performed by the comparing unit.

According to another aspect of the present invention, a control method for a first communication apparatus that functions as a providing apparatus that provides an encryption key or as a receiving apparatus that receives an encryption key provided by a providing apparatus, and that performs a key sharing process for sharing an encryption key with another apparatus, includes the steps of: confirming whether or not the first communication apparatus functioned as the providing apparatus in the key sharing process performed among a plurality of apparatuses present on a network in which the first communication apparatus is joining; comparing identification information of a second communication apparatus that has newly joined the network with identification information of the first communication apparatus; and determining whether or not the first communication apparatus is to function as a providing apparatus in the key sharing process performed between the first communication apparatus and the second communication apparatus based on the result of the confirmation performed in the step of confirming and the result of the comparison performed in the step of comparing.

According to the present invention, it is possible for an encryption key to be shared with communication apparatuses that have newly joined a network even in an environment such as an ad-hoc mode.

Further features of the present invention will become apparent from the following description of an exemplary embodiment (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention shall now be described in detail in accordance with the accompanying drawings.

Hereinafter, a communication apparatus according to the present invention shall be described in detail with reference to the drawings. Although the following describes an example that uses a wireless LAN system compliant with the IEEE 802.11 series, the present invention can be applied to other communication schemes as well.

First, a hardware configuration used in a preferred embodiment of the invention shall be described.

Figure 1:
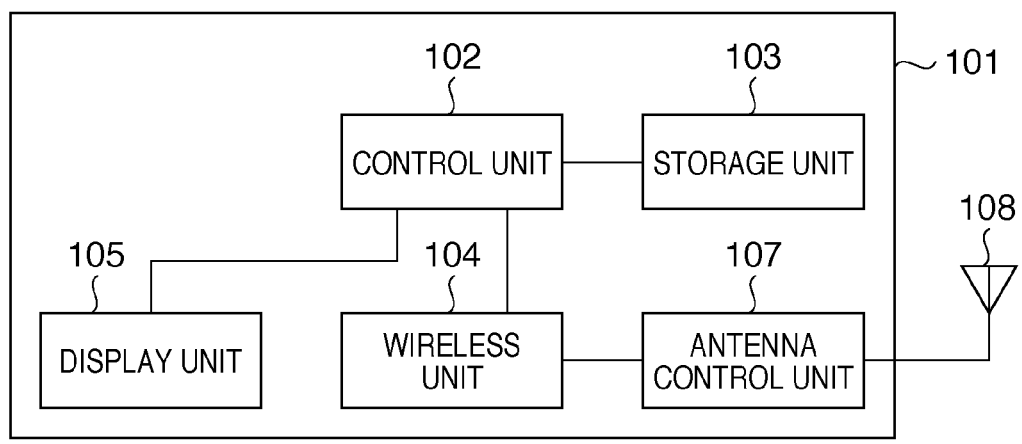
FIG. 1 is a block diagram illustrating a terminal.

FIG. 1 is a block diagram illustrating an example of the configuration of a communication apparatus according to the present embodiment. 101 indicates the overall communication apparatus. 102 is a control unit that controls the overall apparatus by executing a control program stored in a storage unit 103. The control unit 102 also performs sequence control for exchanging encryption keys with other communication apparatuses. 103 is a storage unit that stores the control program executed by the control unit 102 as well as various information such as communication parameters. The various operations illustrated in the operation flowcharts and sequence charts mentioned later are carried out by the control unit 102 executing the control program stored in the storage unit 103. 104 is a wireless unit for performing wireless communication. 105 is a display unit that displays various items, and has functionality rendering it capable of outputting visually-recognizable information using an LCD, LEDs, or the like, or performing audio output using a speaker or the like. 107 is an antenna control unit, and 108 is an antenna.

Figure 3:
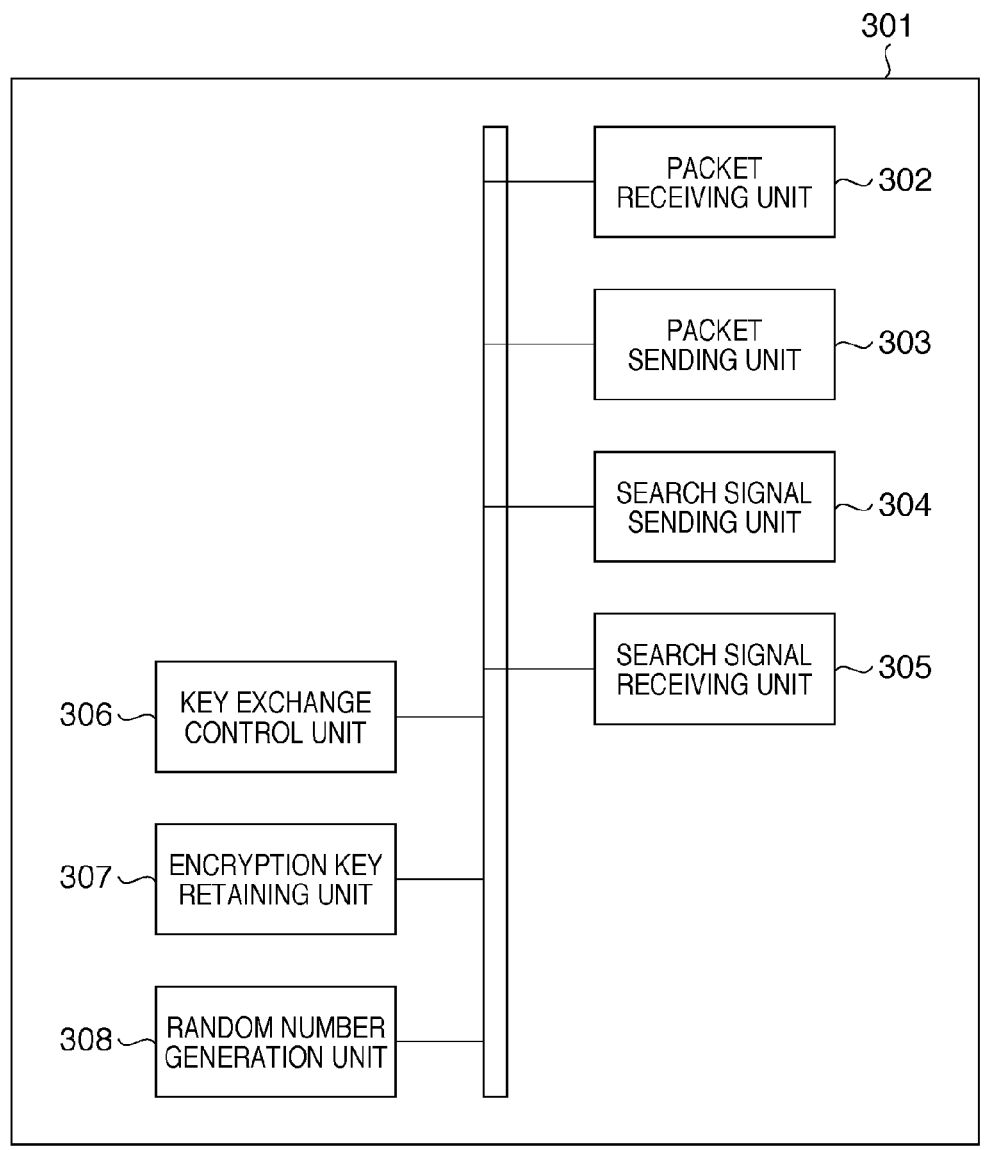
FIG. 3 is a software function block diagram illustrating the inside of a terminal.

FIG. 3 is a block diagram illustrating an example of the configuration of software function blocks executed by the communication apparatus according to the present embodiment.

301 indicates the overall terminal. 302 is a packet receiving unit that receives packets for various types of communication. 303 is a packet sending unit that sends packets for various types of communication. 304 is a search signal sending unit that controls the sending of a device search signal, such as a probe request. The sending of probe requests, discussed later, is carried out by the search signal sending unit 304. Furthermore, the sending of probe responses, which are response signals for received probe requests, is also carried out by the search signal sending unit 304.

305 is a search signal receiving unit that controls the receiving of a device search signal, such as a probe request, from another terminal. The receiving of probe requests, discussed later, is carried out by the search signal receiving unit 305. The receiving of probe responses is also carried out by the search signal receiving unit 305. Note that various information of the device that sent the probe response (self information) is added to each probe response.

306 is a key exchange control unit that performs control of processing sequences for exchanging session keys and group keys with other communication apparatuses. The key exchange control unit 306 performs the various messaging processes used in four-way handshakes and group key handshakes carried out in the WPA key exchange processing exemplified in the present embodiment.

The four-way handshake and group key handshake of WPA (Wi-Fi Protected Access) shall be described briefly hereinafter. In the present embodiment, the four-way handshake and the group key handshake are described as processes for exchanging encryption keys. However, it is also possible to describe these as sharing processes for sharing encryption keys, where one communication apparatus provides an encryption key or information regarding an encryption key to a partner communication apparatus.

The four-way handshake and group key handshake are executed between an authenticating device (an authenticator) and the authenticated device (a supplicant). Note that the following discusses the authenticating device (authenticator) as being the device that performs authentication and the authenticated device (supplicant) as being the device that is authenticated.

In a four-way handshake, the authenticator and supplicant share a shared key in advance (a pre-shared key), and this pre-shared key is used when generating a session key.

First, the authenticator generates a random number (a first random number), and sends a message 1 that includes the generated first random number to the supplicant.

Having received the message 1, the supplicant also generates a random number (a second random number) itself. The supplicant then generates a session key from the second random number it generated itself, the first random number received from the authenticator, and the pre-shared key.

Having generated the session key, the supplicant sends a message 2 that includes the second random number and its own encryption/authentication support information (WPAIE or RSNIE) to the authenticator.

Having received the message 2, the authenticator generates a session key from the first random number it generated itself, the second random number received from the supplicant, and the pre-sharing key. At this stage, the authenticator and the supplicant generate the same session key if their first random numbers, second random numbers, and pre-shared keys are identical.

Having generated the session key, the authenticator sends a message 3 that includes its own encryption/authentication support information (WPAIE or RSNIE) and a session key install instruction to the supplicant.

The authenticator and the supplicant can install the session key upon the sending/receiving of the message 3.

Having received the message 3, the supplicant sends a message 4 to the authenticator, notifying the authenticator that the message 3 has been received.

In this manner, the session key, serving as the encryption key, is exchanged through a four-way handshake, in which the messages 1 through 4 are sent/received between the authenticator and the supplicant (in actuality, random numbers for generating the session key are exchanged). Through this exchange, the encryption key can be shared on the network.

Note that session key can be installed upon the sending/receiving of the message 4.

Meanwhile, in the group key handshake, the authenticator encrypts a group key using the session key exchanged in the four-way handshake. The authenticator then sends a message 1 that includes the encrypted group key to the supplicant. The group key is an encryption key for performing group communication. The group key is therefore sent in the case where the group key that is already being shared with another communication apparatus is to be shared with the supplicant as well. The authenticator generates the group key and sends the generated group key to the supplicant in the case where there is no group key that is being shared with another communication apparatus or the group key that is shared with another communication apparatus is not to be shared with the supplicant.

The supplicant decrypts the group key that is included in the received message 1 using the session key, and sends a message 2 to the authenticator, notifying the authenticator that the message 1 has been received.

In this manner, the group key, serving as the encryption key for group communication, can be shared through a group key handshake, in which the messages 1 and 2 are sent/received between the authenticator and the supplicant.

As described thus far, the authenticator can be referred to as a providing apparatus that provides an encryption key, whereas the supplicant can be referred to as a receiving apparatus (receiving device, etc.) that receives the encryption key provided by the authenticator (the providing apparatus).

Note that the four-way handshake and the group key handshake have been standardized by IEEE 802.11i, and thus the IEEE 802.11i specification should be referred to for details thereof.

307 is an encryption key retaining unit that retains the session keys and group keys exchanged by the key exchange control unit 306. Whether or not a key exchange has taken place with another communication apparatus can be determined based on the information retained in the encryption key retaining unit 307.

308 is a random number generation unit. It is the random number generation unit 308 that generates the random number information used when the key exchange control unit 306 generates the session key as described earlier. A random number generated by the random number generation unit 308 may also be used when generating the group key.

Note that all the functional blocks have mutual relationships whether implemented as software or hardware. Furthermore, the abovementioned functional blocks are examples; a single functional block may be made up of multiple functional blocks, and any of the functional blocks may be further divided into blocks that perform multiple functions.

Figure 2:
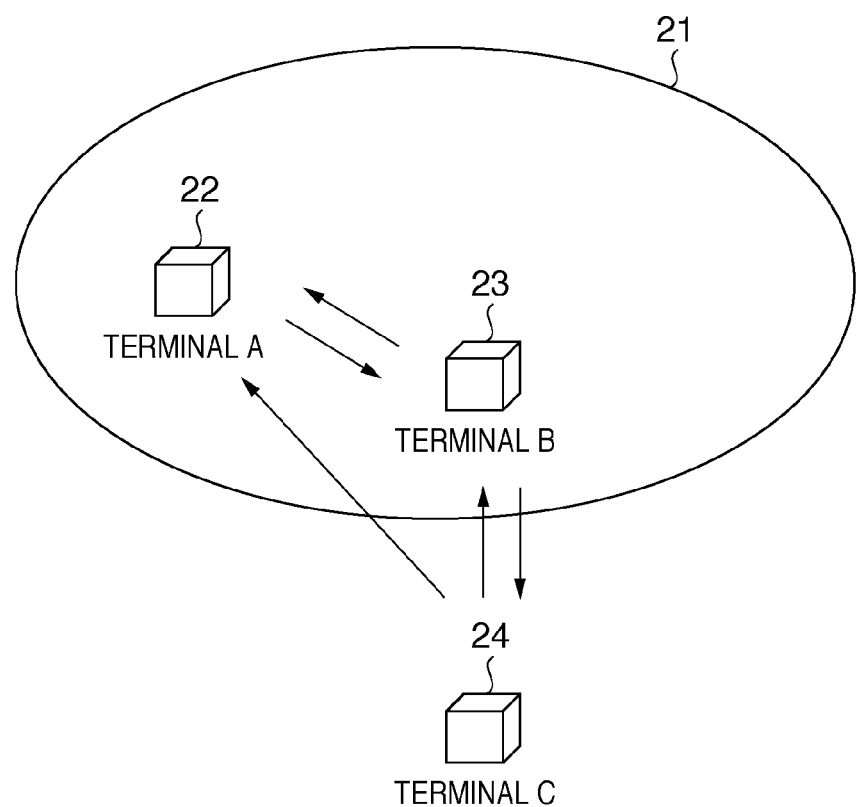
FIG. 2 is a diagram illustrating a configuration in which three terminals form an ad-hoc network.

FIG. 2 is a diagram illustrating terminals A22, B23, and C24, as well as an ad-hoc network 21 created by the terminals A22 and B23.

Each terminal is provided with functionality for wireless LAN communication based on IEEE 802.11, performs wireless communication through wireless LAN ad-hoc (hereinafter, simply "ad-hoc") communication, and has the configuration described earlier with reference to FIGS. 1 and 3.

FIG. 2 assumes that the terminal A22 (hereinafter called "terminal A") and the terminal B23 (hereinafter called "terminal B") have already exchanged encryption keys. In the present embodiment, the terminal A acts as the authenticator and the terminal B acts as the supplicant in the encryption key exchange process that has taken place between the terminals A and B. Furthermore, in order to unify the encryption key shared between the terminals, the process for exchanging encryption keys is assumed to be carried out with the terminal whose MAC (Media Access Control) address is highest acting as the authenticator. Note that the size relationship of the MAC addresses is determined through a comparison based on lexicographic order.

Here, consider a situation in which a new communication apparatus, the terminal C24 (hereinafter called "terminal C") joins the network 21, which has been established through the exchange of encryption keys.

In order for the terminal C to join the network 21, the terminal C first sends a probe request through broadcasting (the terminal to be searched for is not specified), whereupon one of the terminals that makes up the network 21, or the terminal A or terminal B, returns a probe response. Here, in an IEEE 802.11 wireless LAN ad-hoc network, each terminal sends beacons at random. When a probe request has been sent through broadcasting, it is specified that the terminal that sent a beacon immediately prior to receiving the probe request is to return the probe response.

The processing sequence changes depending on whether the terminal A or the terminal B returned the probe response.

In addition, the processing sequence performed when the terminal C joins the network 21 also differs depending on the role of the terminal that returned the probe response with respect to the encryption key exchange process that was active when the probe request was received from the terminal C.

Figure 4:
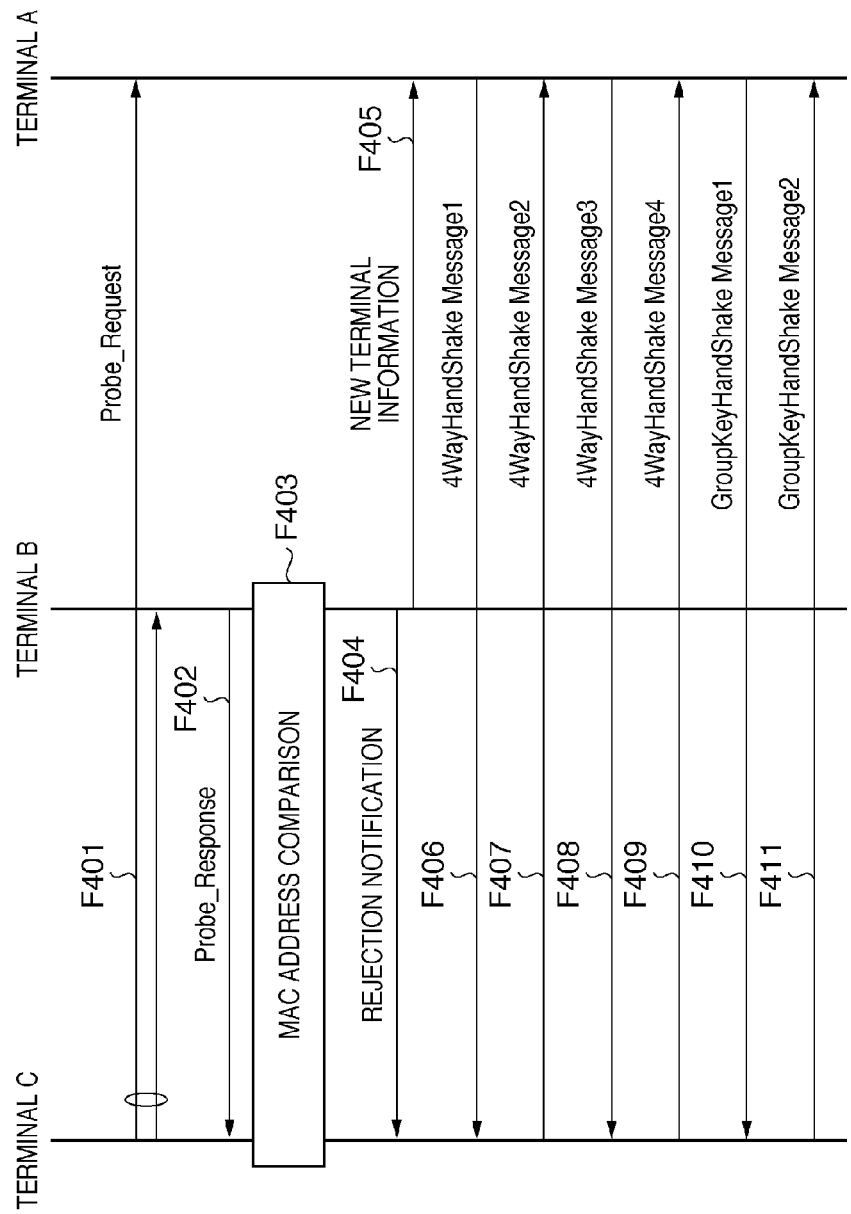
FIG. 4 is a sequence diagram (1) illustrating operations performed by terminals A, B, and C.

FIG. 4 is a diagram illustrating a processing sequence performed in the case where the terminal C has received a probe response from the terminal B upon sending a probe request, when the MAC address size relationship of the terminals is terminal A>terminal B>terminal C.

First, the terminal C sends a probe request through broadcasting in order to attempt to join the network 21, which has been created by the terminals A and B (F401).

Of the terminals A and B, the terminal that has received the probe request returns a probe response to the terminal C. Here, the terminal B has sent a beacon immediately prior to receiving the probe request, and thus the probe response is returned by the terminal B to the terminal C (F402).

Having received the probe response, the terminal C compares the size of its own MAC address to that of the MAC address of the source of the probe response (in other words, the MAC address of the terminal B). The terminal B, which returned the probe response, also compares the size of its own MAC address to that of the MAC address of the destination of the probe response (in other words, the MAC address of the terminal C, which is the source of the probe request) and determines the size relationship therebetween (F403).

As a result of this comparison, the terminal B determines that the MAC addresses of the terminals C and B are in a size relationship in which terminal C<terminal B. In addition, the terminal B confirms the role it itself plays in the encryption key exchange process carried out with the terminal A. As described earlier, terminal A>terminal B with respect to MAC addresses, and the terminal B functions as the supplicant;

therefore, the terminal B does not play the role of authenticator in its relationship with the terminal C as well. This is because if the terminal B were to become the authenticator and execute the encryption key exchange process with the terminal C, the encryption keys would lose their unification on the network. Accordingly, the terminal B does not determined the role of the terminal C, and instead has the terminal A determine this role. As a result, the terminal B determines not to carry out the encryption key exchange process with the terminal C, and sends a key exchange rejection notification to the terminal C (F404).

Furthermore, the terminal B sends a new terminal information notification to the terminal A, notifying the terminal A that the terminal C has joined the network (F405). The MAC address of the new terminal, or the terminal C, is included in the new terminal information notification when that notification is sent.

Having received the new terminal information notification, the terminal A compares the MAC address of the terminal. C included in the new terminal information notification to its own MAC address, and determines that terminal A>terminal C with respect to MAC addresses. As a result, it is determined that the terminal A continues to function as the authenticator, and the terminal C functions as the supplicant. The terminal A then sends the message 1 of the four-way handshake to the terminal C (F406).

If the terminals A and C are capable of communication, the four-way handshake, is continued, after which the group key handshake is carried out (F407 to F411). Note that the terminal A sends the encryption key (group key) it provided to the terminal B through the encryption key exchange process carried out with the terminal B to the terminal C. This makes it possible to unify the encryption keys across the entire network.

The mechanisms of the four-way handshake and the group key handshake are as described in the IEEE 802.11i specification, as mentioned earlier, and thus the details thereof shall be omitted here.

FIG. 4 illustrates a case where the terminal B returns a probe response in response to a probe request sent by the terminal C. Next, a sequence performed when the terminal A returns a probe response shall be described with reference to FIG. 5.

First, the terminal C sends a probe request through broadcasting in order to attempt to join the network 21, which has been created by the terminals A and B (F501).

Of the terminals A and B, the terminal that has received the probe request returns a probe response to the terminal C. Here, the terminal A has sent a beacon immediately prior to receiving the probe request, and thus the probe response is returned by the terminal A to the terminal C (F502).

Having received the probe response, the terminal C compares the size of its own MAC address to that of the MAC address of the source of the probe response (in other words, the MAC address of the terminal A) and determines the size relationship therebetween. The terminal A, which returned the probe response, also compares the size of its own MAC address to that of the MAC address of the destination of the probe response (in other words, the MAC address of the terminal C, which is the source of the probe request) and determines the size relationship therebetween (F503).

As a result of this comparison, the terminal A determines that the MAC addresses of the terminals C and A are in a size relationship in which terminal C<terminal A. In addition, the terminal A confirms the role it itself plays in the encryption key exchange process carried out with the terminal B. As described earlier, terminal A>terminal B with respect to MAC addresses, and the terminal A functions as the authenticator; therefore, it is determined that the terminal A functions as the authenticator in its relationship with the terminal C as well, and that the terminal C functions as the supplicant. This is because the encryption keys can be unified across the entire network by executing the encryption key exchange process with the terminal A as the authenticator and the terminal C as the supplicant.

The terminal A thus continues to function as the authenticator, and sends the message 1 for the four-way handshake to the terminal C (F504).

If the terminals A and C are capable of communication, the four-way handshake is continued, after which the group key handshake is carried out (F505 to F509). As before, the terminal A sends the encryption key (group key) it provided to the terminal B through the encryption key exchange process carried out with the terminal B to the terminal C. This makes it possible to unify the encryption keys across the entire network.

Figure 5:
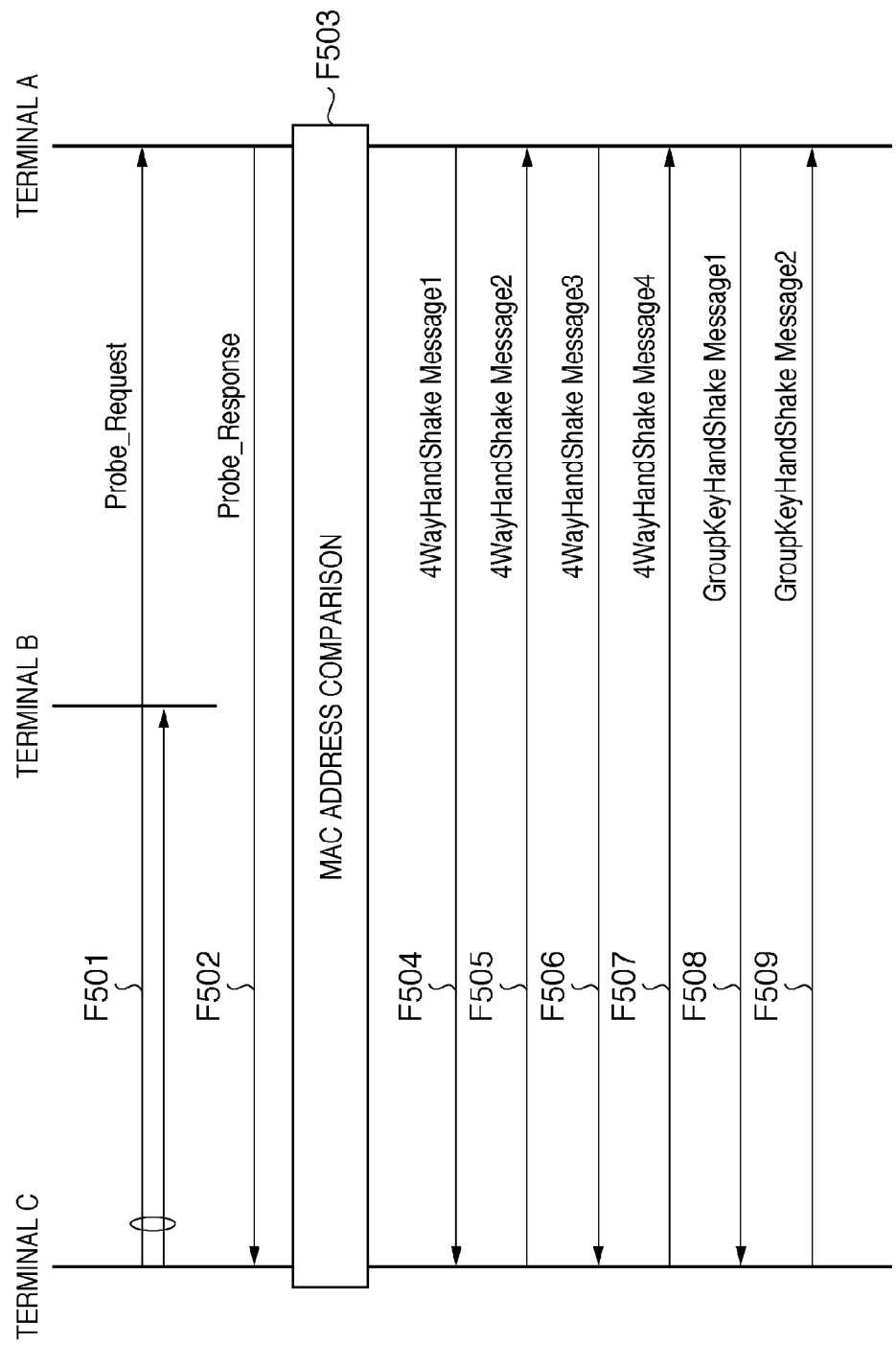
FIG. 5 is a sequence diagram (2) illustrating operations performed by terminals A, B, and C.

Although FIGS. 4 and 5 illustrate the case where the relationship between the MAC addresses of the terminals is terminal A>terminal B>terminal C, a case can also be considered where the relationship is terminal A>terminal C>terminal B or terminal C>terminal A>terminal B.

Next, the case where the size relationship between the MAC addresses of the terminals is terminal A>terminal C>terminal B shall be considered.

As in the aforementioned case where the relationship is terminal A>terminal B>terminal C, two situations, where the source of the probe response is either the terminal A or the terminal B, can be considered.

The case where the probe response is returned from the terminal A shall be discussed first. In this case, the terminal A determines that the size relationship between the MAC addresses is terminal A>terminal C, and also plays the role of authenticator in the encryption key exchange process carried out between the terminal A and the terminal B. Therefore, it is determined that the terminal A continues to function as the authenticator, and the terminal C functions as the supplicant. This results in the same sequence as that shown in FIG. 5.

The case where the probe response is returned from the terminal B shall be discussed next. In this case, the terminal B determines, at F403 in FIG. 4, that the MAC addresses of the terminals C and A are in a size relationship in which terminal C>terminal B. In addition, the terminal B plays the role of supplicant in the encryption key exchange process performed between the terminal B and the terminal A. Therefore, the terminal B does not make the determination as to which role the terminal C will play, and assumes that the role depends on the size relationship between the MAC addresses of the terminal A and the terminal C. The reason for this is that if at this point in time the terminal B were to determine that the terminal C is to be the authenticator and execute the encryption key exchange process with the terminal C, the encryption keys would not match up across the entire network.

Therefore, the terminal B sends a key exchange rejection notification to the terminal C (F404), and sends a new terminal information notification to the terminal A (F405). Having received the new terminal information notification, the terminal A then compares its own MAC address to the MAC address of the terminal C, and determines to perform the key exchange process with the terminal C with the terminal A acting as the authenticator and the terminal C acting as the supplicant. This results in the same sequence as that illustrated earlier in FIG. 4.

Finally, the case where the size relationship between the MAC addresses of the terminals is terminal C>terminal A>terminal B shall be considered.

Figure 6:
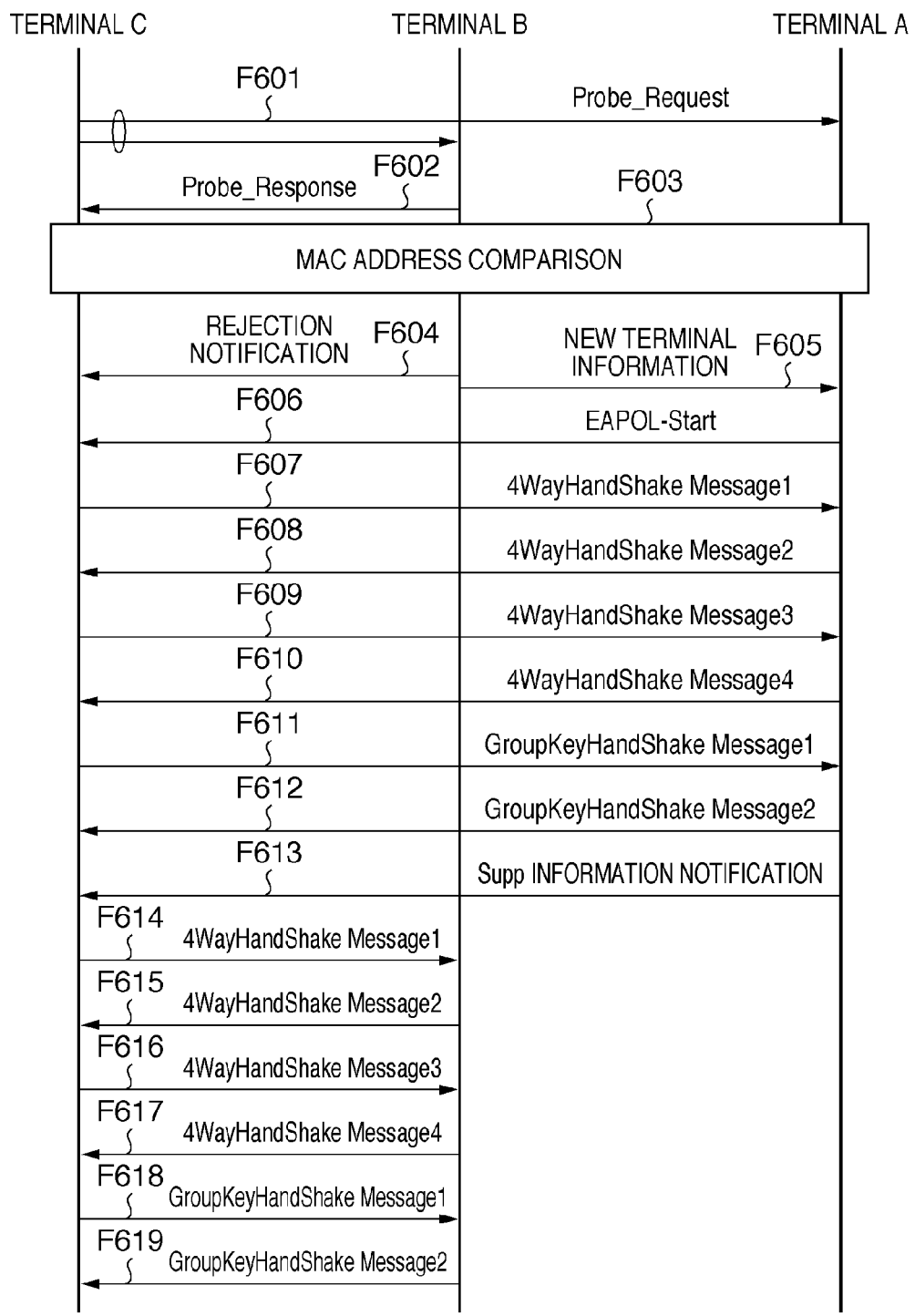
FIG. 6 is a sequence diagram (3) illustrating operations performed by terminals A, B, and C.

In this case, too, two situations, where the source of the probe response is either the terminal A or the terminal B, can be considered. First, a sequence performed when the terminal B returns a probe response shall be described with reference to the sequence chart in FIG. 6.

First, the terminal C sends a probe request through broadcasting in order to attempt to join the network 21, which has been created by the terminals A and B (F601).

Of the terminals A and B, the terminal that has received the probe request returns a probe response to the terminal C. Here, the terminal B has sent a beacon immediately prior to receiving the probe request, and thus the probe response is returned by the terminal B to the terminal C (F602).

Having received the probe response, the terminal C compares the size of its own MAC address to that of the MAC address of the source of the probe response (in other words, the MAC address of the terminal B) and determines the size relationship therebetween. The terminal B, which returned the probe response, also compares the size of its own MAC address to that of the MAC address of the destination of the probe response (in other words, the MAC address of the terminal C, which is the source of the probe request) and determines the size relationship therebetween (F603).

As a result of this comparison, the terminal B determines that the MAC addresses of the terminals C and B are in a size relationship in which terminal C>terminal B. In addition, the terminal B confirms the role it itself plays in the encryption key exchange process carried out with the terminal A. As described earlier, terminal A>terminal B with respect to MAC addresses, and the terminal B confirms that is functioned as the supplicant. Therefore, the terminal B does not make the determination as to which role the terminal C will play, and assumes that the role depends on the size relationship between the MAC addresses of the terminal A and the terminal C. The reason for this is that if at this point in time the terminal B were to determine that the terminal C is to be the authenticator and execute the encryption key exchange process with the terminal C, the encryption keys would not match up across the entire network. Therefore, the terminal B sends a key exchange rejection notification to the terminal C (F604), and also send a new terminal information notification to the terminal A, notifying the terminal A that the terminal C has joined the network (F605).

Having received the new terminal information notification, the terminal A compares the MAC address of the terminal C included in the new terminal information notification to its own MAC address, and determines that terminal A<terminal C with respect to MAC addresses. As a result, it is determined that the terminal A functions as the supplicant, and the terminal C functions as the authenticator. The terminal A then sends an EAPOL-START to the terminal C in order to request the initiation of the four-way handshake (F606).

The "EAPOL-START" referred to here is a message used to request the initiation of authentication, and is, in the present embodiment, used as a message for requesting the initiation of the encryption key exchange process.

Having received the EAPOL-START, the terminal C sends the message 1 of the four-way handshake to the terminal A (F607). If the terminals A and C are capable of communication, the four-way handshake is continued, after which the group key handshake is carried out (F608 to F612).

In order for the role of network authenticator, which has thus far been played by the terminal A, to be passed on to the terminal C, the terminal A communicates information of the supplicant it is aware of (in the present embodiment, information of the terminal B) to the terminal C (F613).

Having been notified of the supplicant, the terminal C performs a new encryption key exchange process with the terminal B, which is the supplicant (F614 to F619). Here, the terminal C sends the encryption key (group key) it provided to the terminal A through the encryption key exchange process carried out with the terminal A to the terminal B as well. This makes it possible to unify the encryption keys across the entire network.

Note that in F613, the terminal A may notify the terminal B, known by the terminal A to be a supplicant, that the terminal C is the new authenticator, rather than communicating the information of the supplicant to the terminal C. In this case, the supplicant terminal B, which has received the notification, can perform the encryption key exchange process with the terminal C by sending the EAPOL-START to the terminal C.

In this manner, the encryption key exchange process is performed with all preexisting terminals even in the case where the new terminal C is the authenticator, and thus the encryption keys can be unified across the entire network.

Figure 7:
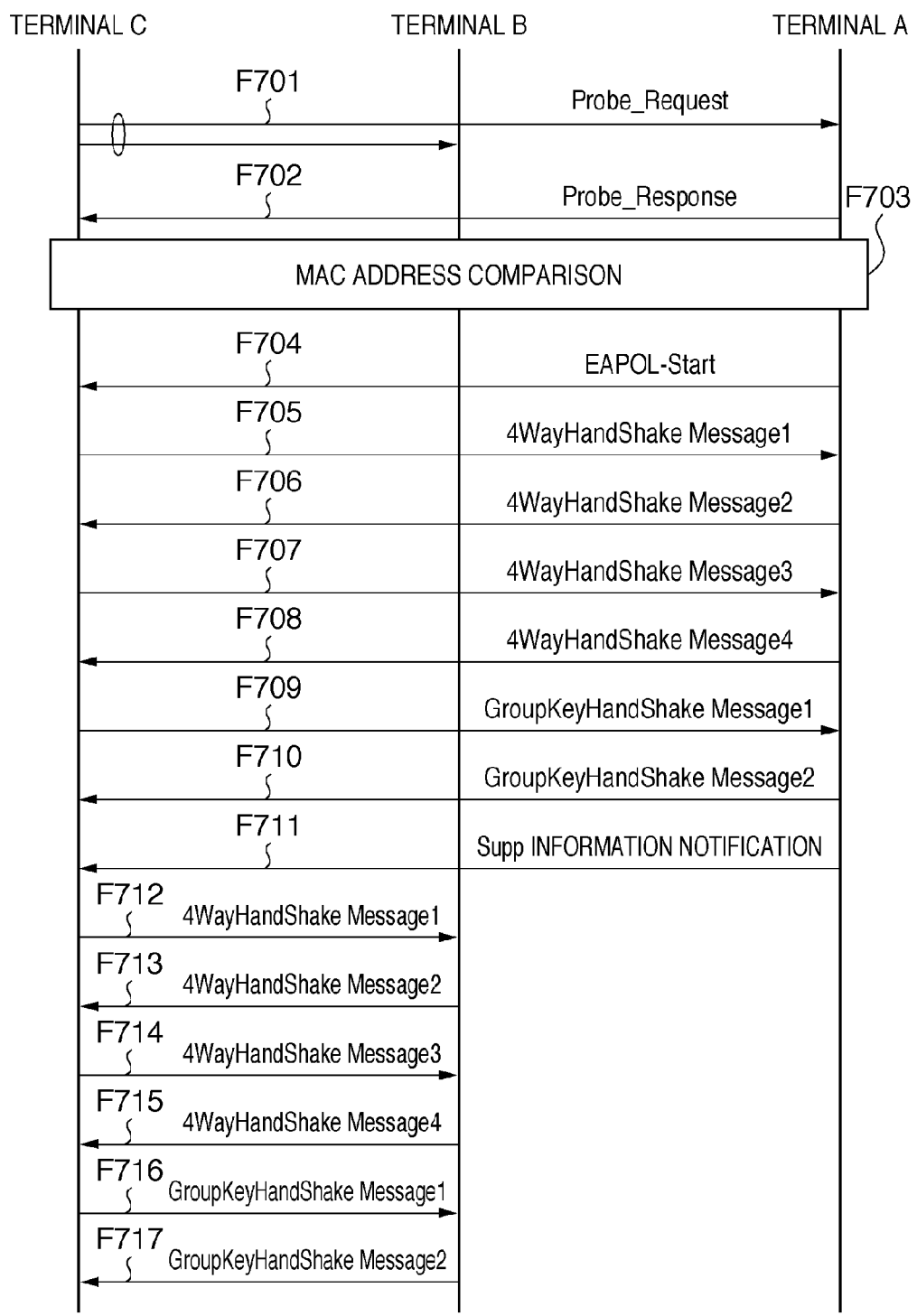
FIG. 7 is a sequence diagram (4) illustrating operations performed by terminals A, B, and C.

Next, a sequence performed when the terminal A returns a probe response shall be described with reference to FIG. 7.

First, the terminal C sends a probe request through broadcasting in order to attempt to join the network 21, which has been created by the terminals A and B (F701).

Of the terminals A and the terminal that has received the probe request returns a probe response to the terminal C. Here, the terminal A has sent a beacon immediately prior to receiving the probe request, and thus the probe response is returned by the terminal A to the terminal C (F702).

Having received the probe response, the terminal C compares the size of its own MAC address to that of the MAC address of the source of the probe response (in other words, the MAC address of the terminal A) and determines the size relationship therebetween. The terminal A, which returned the probe response, also compares the size of its own MAC address to that of the MAC address of the destination of the probe response (in other words, the MAC address of the terminal C, which is the source of the probe request) and determines the size relationship therebetween (F703).

As a result of this comparison, the terminal A determines that the MAC addresses of the terminals C and A are in a size relationship in which terminal A<terminal C.

In addition, the terminal A confirms the role it itself plays in the encryption key exchange process carried out with the terminal B. As described earlier, terminal A>terminal B with respect to MAC addresses, and the terminal A functions as the authenticator; therefore, it is determined that the terminal A functions as the supplicant in its relationship with the terminal C, and that the terminal C functions as the authenticator. The terminal A then sends an EAPOL-START to the terminal C in order to request the initiation of the four-way handshake (F704).

Having received the EAPOL-START, the terminal C sends the message 1 of the four-way handshake to the terminal A (F705). If the terminals A and C are capable of communication, the four-way handshake is continued, after which the group key handshake is carried out (F706 to F710).

In order for the role of network authenticator, which has thus far been played by the terminal A, to be passed on to the terminal C, the terminal A communicates information of the supplicant it is aware of (in the present embodiment, information of the terminal B) to the terminal C (F711).

Having been notified of the supplicant, the terminal C performs a new encryption key exchange process with each supplicant (F712 to F717). Here, the terminal C sends the encryption key (group key) it provided to the terminal A through the encryption key exchange process carried out with the terminal A to the terminal B as well. This makes it possible to unify the encryption keys across the entire network.

Note that in F711, the terminal A may notify the terminal B, known by the terminal A to be a supplicant, that the terminal C is the new authenticator, rather than communicating the information of the supplicant to the terminal C. In this case, the supplicant terminal B, which has received the notification, can perform the encryption key exchange process with the terminal C by sending the EAPOL-START to the terminal C.

In this manner, the encryption key exchange process is performed with all preexisting terminals even in the case where the new terminal C is the authenticator, and thus the encryption keys can be unified across the entire network.

Operational flowcharts for each terminal, used to implement the processing sequences described thus far, shall now be described.

Figure 8:
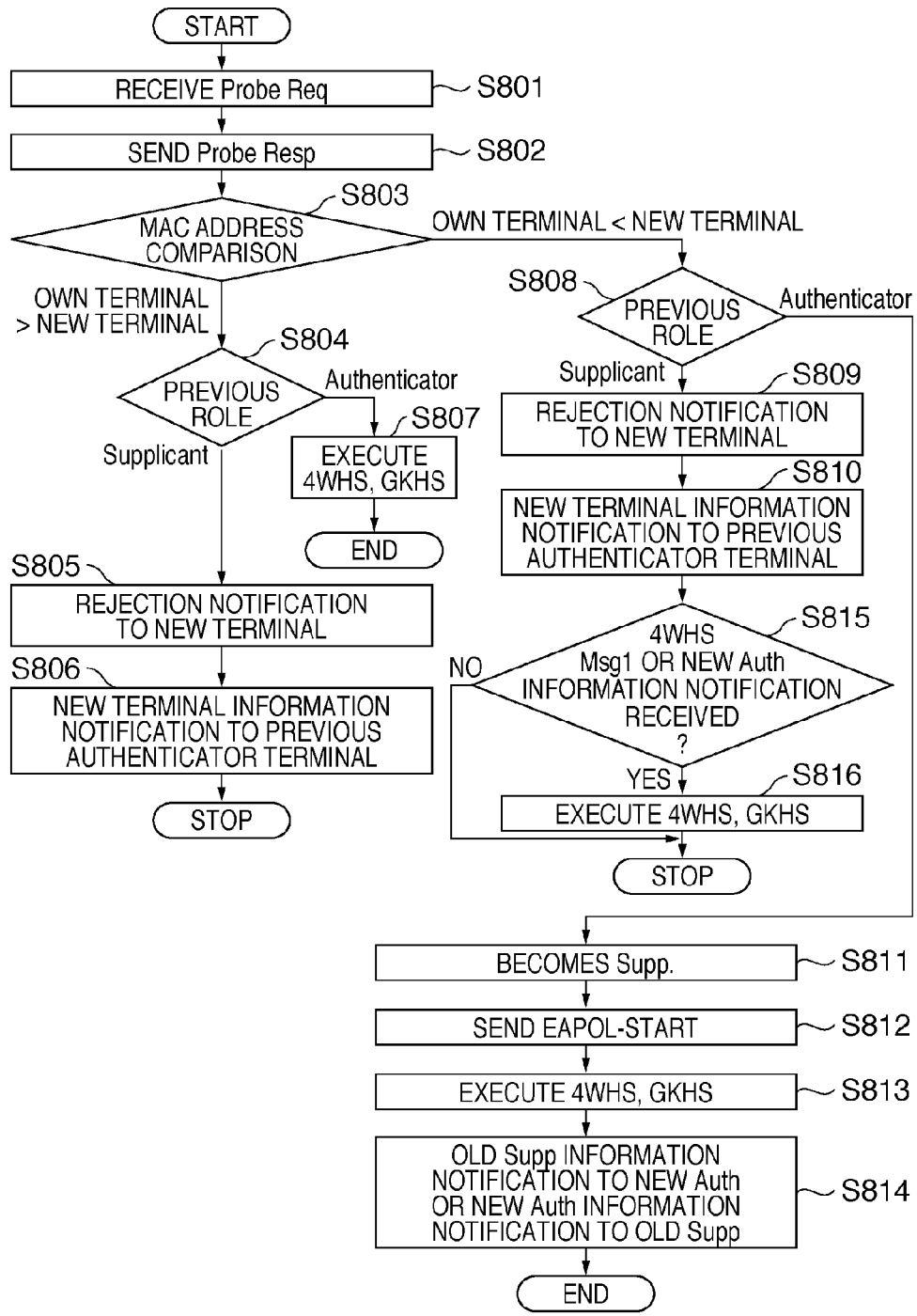
FIG. 8 is a flowchart illustrating operations performed by a preexisting terminal A or a preexisting terminal B.

FIG. 8 is a diagram illustrating the operational flow of a terminal, among terminals present on the preexisting network 21 (called "preexisting terminals" hereinafter), that responds to a probe request from the new terminal C.

First, the preexisting terminal (in the present embodiment, terminal A or terminal B) receives a probe request from the new terminal C (S801). Among the preexisting terminals that received the probe request, the preexisting terminal that sent a beacon immediately prior to receiving the probe request sends a probe response (S802).

The preexisting terminal that sent the probe response then compares its own MAC address with that of the destination terminal of the probe response, or the terminal C (S803).

In the case where the result of the comparison indicates that the preexisting terminal's own MAC address is greater than the new terminal's MAC address, the preexisting terminal confirms the role it played in the encryption key exchange process performed with another preexisting terminal (S804).

In the case where the preexisting terminal functioned as the supplicant, or in other words, is the preexisting terminal B in the present embodiment, the preexisting terminal determines not to determine the role of the new terminal C itself. The preexisting terminal B then sends a key exchange rejection notification to the new terminal C (S805), and sends new terminal information notification to the terminal that was the authenticator when the preexisting terminal B itself functioned as the supplicant, or in other words, to the preexisting terminal A in the present embodiment (S806).

In S804, in the case where the preexisting terminal functioned as the authenticator, or in other words, is the preexisting terminal A in the present embodiment, the preexisting terminal determines that the preexisting terminal itself is the authenticator and the new terminal C is the supplicant. The preexisting terminal A then initiates the encryption key exchange process by sending the message 1 of the four-way handshake to the new terminal C (S807). Here, the encryption key (group key) provided to the preexisting terminal B through the encryption key exchange process carried out between the preexisting terminals A and B is sent to the new terminal C. Through this, the encryption keys of the terminals on the network, including the new terminal, can be unified.

A case where the results of the MAC address comparison performed in S803 indicate that the MAC address of the preexisting terminal itself is lower than the MAC address of the new terminal can also be considered. In this case, too, the preexisting terminal confirms the role it itself played in the encryption key exchange process carried out with the other preexisting terminal (S808).

In the case where the terminal itself functioned as the supplicant, or in other words, is the preexisting terminal B in the present embodiment, the preexisting terminal determines not to determine the role of the new terminal C itself. The preexisting terminal B then sends a key exchange rejection notification to the new terminal C (S809), and sends new terminal information notification to the terminal that was the authenticator when the preexisting terminal B itself functioned as the supplicant, or in other words, to the preexisting terminal A in the present embodiment (S810).

After this, in the case where the results of the MAC address determination performed by the preexisting terminal A indicate that the new terminal C is the authenticator, the preexisting terminal B receives the message 1 of the four-way handshake from the new terminal C (S815). Alternatively, the preexisting terminal B receives a notification from the preexisting terminal A indicating that the new terminal C has become the new authenticator (S815).

Having received the message 1 of the four-way handshake from the new terminal C, the preexisting terminal B proceeds with the four-way handshake and the group key handshake with the new terminal C (S816).

Meanwhile, in the case where the preexisting terminal B has received a notification from the preexisting terminal A indicating that the new terminal C has become the new authenticator, the preexisting terminal B carries out the encryption key exchange process with the new terminal C by sending an EAPOL-START to the new terminal C (S816).

Note that in S816, the preexisting terminal B receives, from the new terminal C, an encryption key that is identical to the encryption key (group key) provided to the preexisting terminal A through the encryption key exchange process carried out between the new terminal C and the preexisting terminal A. This unifies the encryption keys across the entire network.

The case where neither message is received in S815 means that the preexisting terminal A has determined to continue playing the role of authenticator, and because there is no need for the preexisting terminal B to perform the encryption key exchange process, the processing then ends.

In the case where the results of the determination in S808 indicate that the preexisting terminal itself functioned as the authenticator, or in other words, is the preexisting terminal A in the present embodiment, it is determined that the new terminal C is to be the authenticator, and the preexisting terminal itself is to be the supplicant (S811). The preexisting terminal A then sends an EAPOL-START to the new terminal C (S812), and carries out the encryption key exchange process with the new terminal C (S813). After this, in order to unify the encryption keys across the entire network, the preexisting terminal A forwards information of the supplicants it has known of thus far, or in other words, information of the preexisting terminal B in the present embodiment, to the new terminal C (S814). Note that in S814, the preexisting terminal A may communicate information of the new terminal C, which is the new authenticator, to the preexisting terminal B, known by the preexisting terminal A to be a supplicant terminal thus far.

Figure 10:
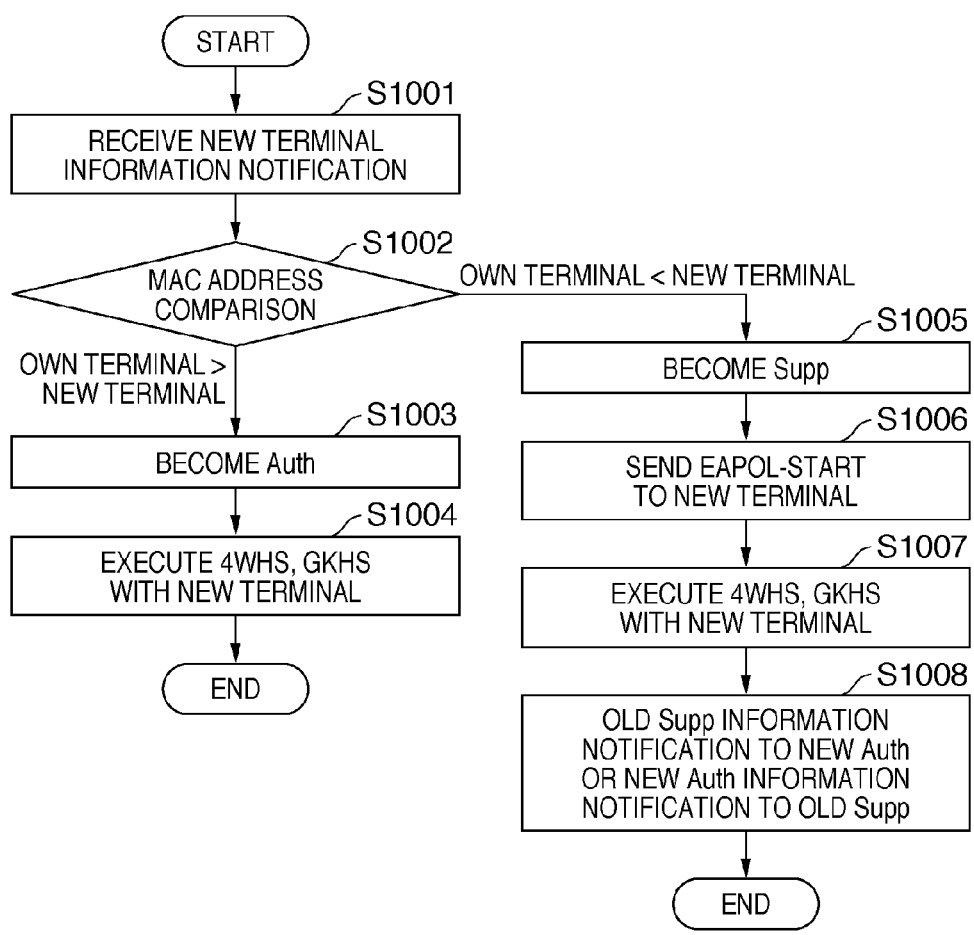
FIG. 10 is a flowchart illustrating operations performed by a terminal that is a previous authenticator.

Next, an operational flowchart for the terminal that received the new terminal information notification provided in S806 or S810 in FIG. 8 (the preexisting terminal A, in the present embodiment) shall be described with reference to FIG. 10.

The preexisting terminal A, which functioned as the authenticator in the encryption key exchange process performed with the preexisting terminal B, receives a new terminal information notification from the preexisting terminal B, which functioned as the supplicant (S1001). As described above, the MAC address of the new terminal C is included in this new terminal information.

Upon receiving the new terminal information notification, the preexisting terminal A compares the MAC address of the new terminal C included in the new terminal information to its own MAC address (S1002).

If the result of the comparison in S1002 indicates that the MAC address of the terminal itself is greater, it is determined that the preexisting terminal A is to continue functioning as the authenticator and the new terminal C is to become the supplicant (S1003). The preexisting terminal A then initiates the encryption key exchange process by sending the message 1 of the four-way handshake to the new terminal C (S1004). Here, the same encryption key as the encryption key (group key) provided to the preexisting terminal B through the encryption key exchange process carried out between the preexisting terminals A and B is sent to the new terminal C. This makes it possible to unify the encryption keys across the entire network.

However, if the result of the comparison in S1002 indicates that the MAC address of the terminal itself is smaller, it is determined that the new terminal C is to be the authenticator and that the preexisting terminal A is to function as the supplicant (S1005).

The preexisting terminal A then sends an EAPOL-START to the new terminal C (S1006). If the preexisting terminal A and the new terminal C are capable of communication, the four-way handshake and the group key handshake are then carried out (S1007). After this, in order to unify the encryption keys across the entire network, the preexisting terminal A forwards information of the supplicant it has known of thus far, or the preexisting terminal B, to the new terminal C (S1008). Note that in S1008, the preexisting terminal A may communicate information of the new terminal C, which is the new authenticator, to the preexisting terminal B, known by the preexisting terminal A to be a supplicant terminal thus far.

An operational flowchart for the new terminal C shall now be described with reference to FIG. 9.

The new terminal C sends a probe request through broadcasting (S901), and receives a probe response from a preexisting terminal (S902).

Upon receiving the probe response, the new terminal C compares its own MAC address with that of the terminal that is the source of the probe response (S903).

In the case where the result of the comparison indicates that the new terminal C's own MAC address is greater than the MAC address of the terminal that is the source of the probe response, the new terminal C confirms whether or not it is to receive a key exchange rejection notification from the terminal that is the source of the probe response (S904).

In the case where a key exchange rejection notification has been received, the new terminal C waits to receive the message 1 of the four-way handshake or an EAPOL-START from a preexisting terminal aside from the terminal that is the source of the probe response (S905). Here, in the case where one of these messages has been received, the procedure advances to S906 when the BSSID (network identifier) of the terminal that is the source of the message is identical to the BSSID of the terminal that is the source of the probe response. This makes it possible to execute the encryption key exchange process after confirming whether or not that preexisting terminal belongs to the same network as the terminal that is the source of the probe response.

Meanwhile, in the case where neither of these messages has been received, or the case where either of the messages has been received but the BSSID of the terminal that is the source of the message is different from the BSSID of the terminal that is the source of the probe response, the procedure returns to S901. In the present embodiment, the preexisting terminal A is the source of one of the messages.

In S906, the new terminal C proceeds to carry out the four-way handshake and the group key handshake, and the encryption key exchange process with the preexisting terminal A is completed. Note that in the case where the message 1 of the four-way handshake has been received in S905, the new terminal C functions as the supplicant, whereas if an EAPOL-START has been received, the new terminal C functions as the authenticator.

After this, when the new terminal C receives an information notification from the terminal (in the present embodiment, the preexisting terminal B) that functioned as the supplicant in the key exchange process performed with the preexisting terminal (S907), the procedure advances to S908. The key exchange process is then initiated by sending the message 1 of the four-way handshake to the preexisting terminal B included in that notification (S908). Note that the information of the preexisting terminal B is received in S907 in the case where the new terminal C functioned as the authenticator in the encryption key exchange process of S906. In this case, in S908, the new terminal C sends the same encryption key as the encryption key provided to the preexisting terminal A in the encryption key exchange process performed in S906 to the preexisting terminal B as well.

In addition, the same key exchange process is also executed with the preexisting terminal B (S908) in the case where an EAPOL-START is received from the terminal (in the present embodiment, the terminal B) that functioned as the supplicant in the key exchange process performed with the preexisting terminal in S907.

Performing such a process makes it possible to unify the encryption keys across the entire network, even in the case where the new terminal C is the authenticator.

In the case where the key exchange rejection notification is not received in S904, the new terminal C determines that its own role is that of authenticator (S909), and executes the encryption key exchange process (S910).

In the case where the results of the MAC address comparison performed in S903 indicate that the MAC address of the new terminal C itself is lower than the MAC address of the terminal that is the source of the probe response, the new terminal C determines that its own role is that of supplicant (S911).

The new terminal C then waits for the reception of the message 1 of the four-way handshake from the preexisting terminal (S912). Here, in the case where the message 1 of the four-way handshake has been received, the procedure advances to S913 when the BSSID of the terminal that is the source of the message 1 is identical to the BSSID of the terminal that is the source of the probe response. This makes it possible to execute the encryption key exchange process after confirming whether or not the terminal belongs to the same network as the terminal that is the source of the probe response. However, the procedure returns to S901 in the case where the message 1 of the four-way handshake has not been received, or in the case where the message 1 has been received but the BSSID of the terminal that is the source of the message 1 is different from the BSSID of the terminal that is the source of the probe response.

In S913, the new terminal C proceeds to execute the four-way handshake and the group key handshake with the terminal that is the source of the message 1, and the encryption key exchange process is completed (S913). Here, the new terminal C receives the same encryption key as the encryption key shared between the preexisting terminals through the encryption key exchange process carried out between the preexisting terminals. This unifies the encryption keys across the entire network.

As described thus far, the preexisting terminal that sends the probe response determines whether or not to perform the key exchange process with the new terminal based on the role that preexisting terminal itself played in the key exchange process carried out between the preexisting terminals. Furthermore, the preexisting terminal that determined to perform the key exchange process with the new terminal determines the roles to be played in the key exchange process carried out between itself and the new terminal, and the new terminal operates in accordance with that determination. In this manner, the encryption keys can be easily unified across the entire network through the terminals operating cooperatively with one another.

Figure 9:
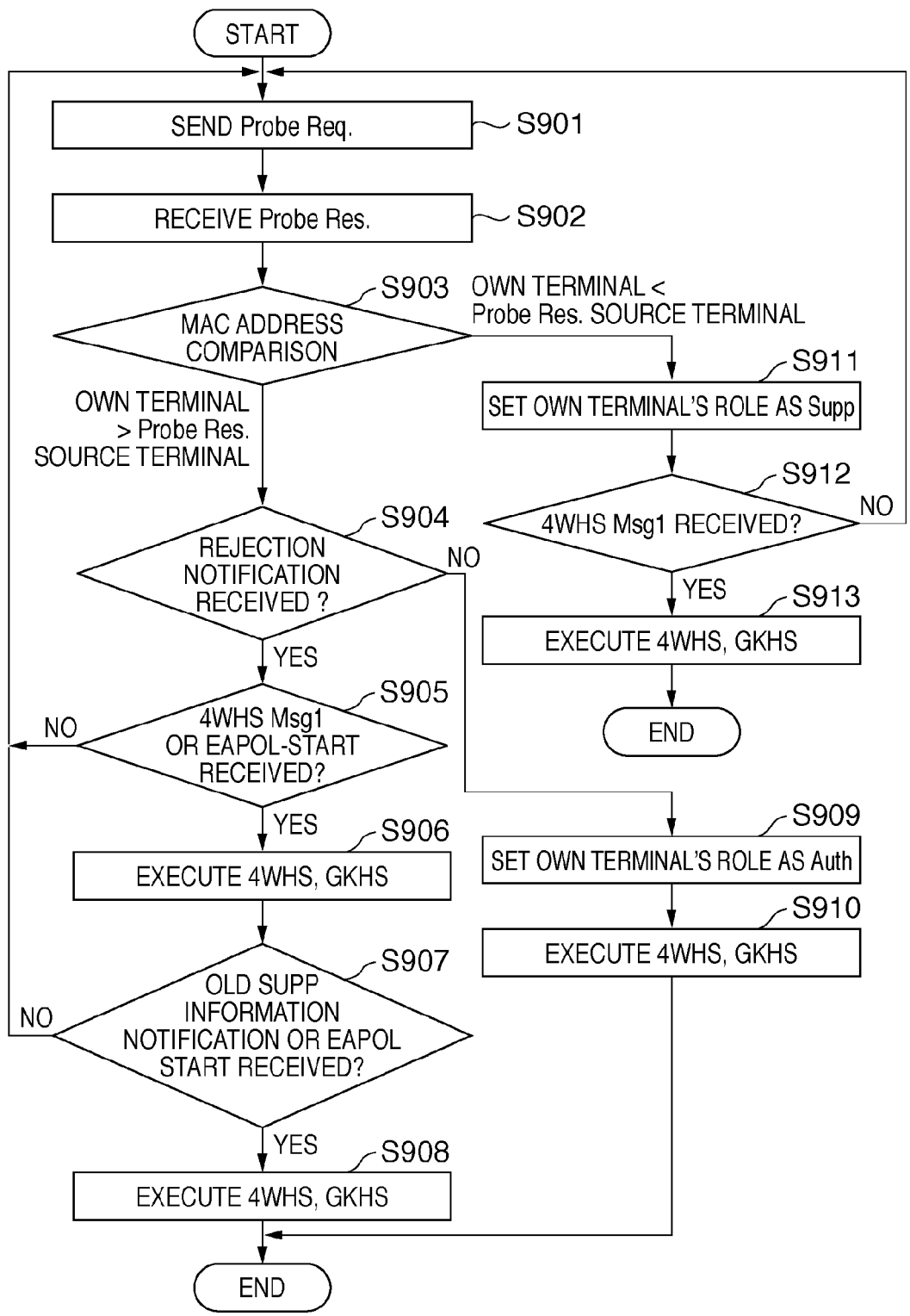
FIG. 9 is a flowchart illustrating operations performed by a new terminal C.

Note that the MAC address comparison process in S903 of FIG. 9 may be omitted. In such a case, the new terminal C may stand by for reception of the message 1 of the four-way handshake or the EAPOL-START from the preexisting terminal for a set amount of time, and then determine its own role in based on the message of which it is notified. Here, in the case where the message of the four-way handshake has been received from the preexisting terminal, the new terminal C may function as the supplicant, whereas if an EAPOL-START has been received, the new terminal C may function as the authenticator.

Furthermore, the sequence charts illustrated in FIGS. 4 through 7 are merely examples of the present invention. In other words, it goes without saying that sequence charts that differ from those illustrated in FIGS. 4 through 7 are also included in the scope of the present invention as long as they fulfill the essence of the details indicated in the determination flowcharts illustrated in FIGS. 8 through 10.

Although an embodiment of the present invention has been described thus far, it should be noted that this merely describes an example of the present invention, and the scope of the present invention is not intended to be limited to the foregoing embodiment. The embodiment may be modified in various ways without departing from the essential spirit of the present invention.

For example, while the above embodiment describes using a key exchange message specified by the WPA standard, the key exchange method is not limited thereto. Any key exchange method may be used as long as it enables the fulfillment of the same roles.

Furthermore, although the size relationship of MAC addresses is used to determine the roles in the key exchange process, this determination may be performed using identification information aside from the MAC addresses.

Finally, although the above embodiment describes a case where the new terminal C joins a network in which two terminals are already joining, the present invention can also be applied in a case where three or more preexisting terminals are already present. For example, a case where the encryption key exchange process is carried out in order for a new terminal D to join the network, after the terminal C has joined the network, can be considered. In this case, the terminal that returns a probe response in response to the probe request from the terminal C determines the roles to be played in the key exchange process carried out between the terminals A, B, and C in S804 and S808 of FIG. 8. Performing the subsequent flow of processes based on the results of that determination makes it possible to unify the encryption keys across the entire network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-314793, filed on Dec. 5, 2007, which is hereby incorporated by reference herein in its entirety.

The invention claimed is:

1. A first communication apparatus that functions as one of (i) a providing apparatus that provides an encryption key and (ii) a receiving apparatus that receives an encryption key provided by a providing apparatus, the first communication apparatus comprising:
 a processor configured to function as
  a performing unit adapted to perform a key sharing process for sharing an encryption key with another apparatus, wherein the encryption key is used for encrypting information transmitted on a network to which the first communication apparatus and a third communication apparatus belong;
  a confirmation unit adapted to confirm whether or not the first communication apparatus functioned as the providing apparatus in the key sharing process performed with the third communication apparatus;
  a comparing unit adapted to compare identification information of a second communication apparatus that has newly joined the network with identification information of the first communication apparatus;
  a determination unit adapted to determine whether or not the first communication apparatus is to function as a providing apparatus in the key sharing process performed with the second communication apparatus based on the result of the confirmation performed by the confirmation unit and the result of the comparison performed by the comparing unit; and
  a first notification unit adapted to notify the third communication apparatus of first information or notify the second communication apparatus of second information in the case where the confirmation unit has confirmed that the first communication apparatus functioned as the providing apparatus in the key sharing process with the third communication apparatus and the determination unit determines that the first communication apparatus will not function as the providing apparatus in the key sharing process with the second communication apparatus,
 wherein the first information is used for identifying the second communication apparatus which becomes a new providing apparatus, and
 wherein the second information is used for identifying the third communication apparatus which functioned as the receiving apparatus in the key sharing process with the first apparatus.

2. The first communication apparatus according to claim 1, wherein in the case where the confirmation unit has confirmed that the first communication apparatus functioned as a providing apparatus, the determination unit determines whether or not the first communication apparatus is to function as a providing apparatus based on the result of the comparison performed by the comparing unit.

3. The first communication apparatus according to claim 1, further comprising a second notification unit adapted to communicate information of the second communication apparatus to the third communication apparatus that functioned as a providing apparatus in the key sharing process performed with the first communication apparatus, in the case where the confirmation unit has confirmed that the first communication apparatus functioned as a receiving apparatus.

4. The first communication apparatus according to claim 3, wherein the information of the second communication apparatus communicated by the second notification unit is communicated for the third communication apparatus to determine the role of the second communication apparatus.

5. The first communication apparatus according to claim 3, further comprising a third notification unit adapted to communicate a key sharing process rejection to the second communication apparatus in the case where the confirmation unit has confirmed that the first communication apparatus functioned as a receiving apparatus.

6. The first communication apparatus according to claim 1, further comprising a receiving unit adapted to receive a search signal for searching for a network, wherein the determination performed by the determination unit is performed in the case where the search signal has been received.

7. A control method for a first communication apparatus that functions as one of (i) a providing apparatus that provides an encryption key or as and (ii) a receiving apparatus that receives an encryption key provided by a providing apparatus, and that performs a key sharing process for sharing an encryption key with another apparatus, wherein the encryption key is used for encrypting information transmitted on a network to which the first communication apparatus and a third communication apparatus belong, the method comprising the steps of:

confirming whether or not the first communication apparatus functioned as the providing apparatus in the key sharing process performed with the third communication apparatus;

comparing identification information of a second communication apparatus that has newly joined the network with identification information of the first communication apparatus;

determining whether or not the first communication apparatus is to function as a providing apparatus in the key sharing process performed with the second communication apparatus based on the result of the confirmation performed in the step of confirming and the result of the comparison performed in the step of comparing; and notifying the third communication apparatus of first information or notifying the second communication apparatus of second information in the case where it has been confirmed that the first communication apparatus functioned as the providing apparatus in the key sharing process with the third communication apparatus and it is determined that the first communication apparatus will not function as the providing apparatus in the key sharing process with the second communication apparatus, wherein the first information is used for identifying the second communication apparatus which becomes a new providing apparatus, and wherein the second information is used for identifying the third communication apparatus which functioned as the receiving apparatus in the key sharing process with the first apparatus.

8. A non-transitory computer-readable storage medium in which is stored a program for causing a computer to control a function as the first communication apparatus to perform the method of according to claim 7.

* * * * *